3,078,220
PREPARATION OF HEXAHALOETHANES
Wayne A. Cassatt, Jr., Karachi, Pakistan, and Russell G. Bradley, Germantown, Md., assignors to Phillips Petroleum Company, a corporation of Delaware
No Drawing. Filed July 16, 1959, Ser. No. 827,431
6 Claims. (Cl. 204—163)

This invention relates to the preparation of hexahaloethanes. In another aspect, it relates to a method for preparing hexahaloethanes, such as hexachloroethane, by actinic radiation of trihalomethanes, such as trichloromethane.

Hexahaloethanes are important industrial chemicals. For example, hexachloroethane is used in organic synthesis, as a retarding agent in fermentation, camphor substitute in celluloid manufacture, rubber accelerator, solvent, explosives, and medicine. Various methods have been proposed or used in the past for the preparation of these halogenated hydrocarbons.

An object of the subject invention is to produce hexahaloethanes, such as hexachloroethanes. Another object is to provide an improved method for preparing hexahaloethanes.

We have discovered that hexahaloethanes, $C_2X_6$, can be prepared by the actinic radiation of trihalomethanes, $HCX_3$, where X is a halogen radical selected from the group consisting of bromine, chlorine, and fluorine, the three halogen radicals being the same or different. This irradiation reaction can be desirably promoted by carrying it out in the presence of a halogen selected from the group consisting of bromide, chlorine, and fluorine.

Representative trihalomethane reactants which can be used according to this invention, and the hexahaloethane products thereof, are set forth in Table I.

TABLE I

| Trihalomethane reactant | Hexahaloethane product |
| --- | --- |
| Trichloromethane | Hexachloroethane. |
| Tribromomethane | Hexabromoethane. |
| Trifluoromethane | Hexafluoroethane. |
| Bromodichloromethane | 1,2-dibromo-1,1,2,2-tetrachloroethane. |
| Dibromochloromethane | 1,1,2,2-tetrabromo-1,2-dichloroethane. |
| Chlorodifluoromethane | 1,2-dichloro-1,1,2,2-tetrafluoroethane. |
| Dichlorofluoromethane | 1,1,2,2-tetrachloro-1,2-difluoroethane. |
| Dibromofluoromethane | 1,1,2,2-tetrabromo-1,2-difluoroethane. |
| Bromodifluoromethane | 1,2-dibromo-1,1,2,2-tetrafluoroethane. |
| Bromochlorofluoromethane | 1,2-dibromo-1,2-dichloro-1,2-difluoroethane. |

Where the three halogen radicals in the trihalomethane reactant are all the same, we prefer to carry out the irradiation reaction in the presence of the corresponding halogen molecule. For example, where the irradiation of trichloromethane is carried out in the presence of a halogen molecule, chlorine, $Cl_2$, is used. When the three halogen radicals in the trihalomethane reactant are not the same, the reaction is desirably promoted in the presence of that halogen molecule having the greatest molecular weight. For example, when fluorodichloromethane is the reactant, then chlorine, $Cl_2$, is used as the promoter of the reaction; and, when bromochlorofluoromethane is the reactant, then bromine, $Br_2$, is used as the promoter of the reaction.

Where a halogen is used to promote the irradiation reaction, it is generally used in amounts of 2 to 25 parts, preferably 50 parts by weight, for each 100 parts of the trihalomethane.

The actinic radiation used in carrying out the method of this invention will generally have a potential or energy level in the range of 3.1 to $1 \times 10^8$ electron volts. The radiation dose rate will generally be from $10^3$ to $10^7$ roentgens equivalent physical per hour (rep./hr.), and the total radiation dosage will generally be from $10^5$ to $10^{11}$ rep., preferably $10^7$ to $10^9$ rep. Lower radiation rates can be used but are not practical from a time standpoint since the rate of reaction will be correspondingly slow, and higher rates, although usable, are difficult to attain and are not necessary in the practice of this invention. The radiation dosages and rates, as used herein, are internal or actual dosages and rates received by the reaction system. The unit of roentgen equivalent physical corresponds to an absorption of 93 ergs/gram of material, the material being water, hydrocarbon or rubber which have very nearly the same absorption co-efficients. The unit of roentgen equivalent physical is also equal to $5.80 \times 10^{13}$ electron volts.

Actinic radiation useful in the practice of this invention include activating rays such as ultraviolet rays having a wavelength in the range of 100 to 3800 Angstroms, and ionizing rays such as alpha rays, beta rays, gamma rays, X-rays, deuterons, protons, and neutrons. The ultraviolet rays can be supplied from lamps or other apparatus which are available for generation of such rays. Sources of radiation include electrical devices such as cathode tubes, which produce electrons, and various accelerators, such as cyclotron, synchrotron, betatron, which produce electrons, protons, deuterons and alpha particles. The natural and artificial radioactive elements can also be used as sources of radiation. The radioactive isotopes of radium, thorium, bismuth, palladium, cobalt, phosphorus, strontium, and the like can be used as a source of rays. Spent fuel elements can also be used as radiation sources, particularly since they are a low cost source of ionizing radiation. Still another source of ionizing radiation are the highly energetic fragments which result at the moment of fission.

The irradiation reaction of this invention can be effected in the vapor phase, the liquid phase, or part in the vapor phase and part in the liquid phase, and the reaction can be either continuous or batch operation. Generally, the liquid phase process is preferred.

The reaction temperature will vary, depending upon the reactants used, the type of radiation, etc., and generally will be effected at a temperature above the melting point of the trihalomethane reactant and a temperature below about 250° C. Temperatures between 10 and 100° C. are preferred.

The hexahaloethane reaction product can be recovered from the reaction mixture by any convenient means. For example, the reaction mixture can be distilled to separate the hexahaloethane product from byproducts, unreacted trihalomethane, and unreacted halogen. The products can be purified by crystallization, solvent extraction, distillation, and by other well-known methods.

To further illustrate the objects and advantages of this invention, the following examples are hereby set forth. It should be understood that in these examples the various reactants, temperatures, radiation procedure, and other factors, are set forth for illustrative purposes and should not be construed so as to unduly limit the subject invention.

*Example I*

Hexachloroethane was produced in the following manner by irradiation of chloroform with gamma rays. Two runs were made: in run 1 no chlorine promoter was used, and in run 2, chlorine was used as a reaction promoter. The runs were made in steel bombs having a glass liner. The reactants were placed in the steel bomb and the sealed bombs were then placed in a field of gamma rays from spent fuel elements obtained from Materials Testing Reactor at Arco, Idaho, at a canal temperature between 20 and 30° C. After irradiation, the bombs were removed and vented to the atmosphere. A portion of the recovered material from each run was placed in a flask equipped with a condenser. The neck of the flask leading to the condenser contained a "cold finger." The flask was heated to distill unreacted chloroform. After the chloroform was removed and a trace of the hexachloroethane was observed to condense on the upper end of the condenser, tap water (15–20° C.) was circulated through the cold finger. The hexachloroethane which sublimed condensed on the surface of the cold finger in the neck of the flask. The sublimation temperature was about 187° C., as compared with a reported value of 187° C. The pertinent data for each of runs 1 and 2 are set forth in Table II.

TABLE II

|  | Run 1 | Run 2 |
|---|---|---|
| Chloroform, g | 199.3 | 155.7 |
| Chlorine, g | 0 | 24.9 |
| Internal radiation dose rate, rep./hr | $2.65 \times 10^6$ | $1.52 \times 10^6$ |
| Total internal radiation dosage, rep | $3 \times 10^7$ | $3 \times 10^7$ |
| Hexachloroethane yield, wt. percent, based on chloroform | 0.4 | 2.7 |

The data in Table II show that the presence of the halogen, $Cl_2$, promotes the reaction.

*Example II*

Hexachloroethane was prepared by irradiating chloroform with gamma rays according to the procedure of Example I. In one run, run 3, no chlorine was used as a reaction promoter, and in run 4 chlorine was used as a reaction promoter. After radiation, the reaction mixtures were removed from the sealed bombs.

In run 3, 170.6 grams of material was recovered and distilled at atmospheric pressure. A residue representing material boiling above 60° C. was recovered and weighed 12.2 grams. This residue was redistilled to yield 3.65 grams of material boiling between 60 and 81° C. The residue amounting to 7.03 grams was sublimed at a temperature below 5 mm. of mercury pressure by warming to a temperature of about 65° C. The material which sublimed was collected on a cold finger maintained near the Dry Ice temperature. This sublimed material weighed 5.65 grams and was further fractionated by distillation to yield 1.94 grams of material boiling below 165° C. and a residue weighing 2.60 grams and representing material boiling above 165° C. The latter residue was sublimed; a first portion of sublimate weighed 1.12 grams and represented a mixture of crystalline material and a liquid. After removing this first portion from the cold finger, a second portion amounting to 0.59 gram was collected. The two sublimed fractions were combined and dissolved in approximately 10 ml. of cyclohexane by warming the latter to about 50° C. The cyclohexane solution was then cooled to 0° C. The crystals which formed were removed by filtration and washed with a small amount of cold cyclohexane. The crystals were then dried in air. The molecular weight as determined by the freezing point depression of a benzene solution was found to be 260±20.

For run 4, 115.7 grams of material was recovered from the bomb and distilled at atmospheric pressure to yield 4.97 grams of a residue having a boiling point above 176° C. During the distillation, crystals formed in the condenser; these crystals were recovered and weighed 2.1 grams. The residue was sublimed as previously described in run 3 to give a first fraction weighing 2.2 grams and a second fraction weighing 1.6 grams. The second fraction was mixed with 2.1 grams of crystals which had been removed from the condenser during the distillation. An aliquot of the mixture weighing 3.7 grams was recrystallized from cyclohexane. The crystals were washed with a small portion of cyclohexane and dried in air. These crystals sublimed at a temperature between 185 and 190° C., as compared to a reported value of 187° C. for hexachloroethane. The molecular weight as determined by the freezing point depression of a benzene solution was found to be 232±5, as compared with a theoretical value of 237 for hexachloroethane. The weight percent of chlorine was found to be 89.7, as compared with a theoretical value of 89.9.

The pertinent data for each of runs 3 and 4 are set forth in Table III.

TABLE III

|  | Run 3 | Run 4 |
|---|---|---|
| Chloroform, g | 175.9 | 111.6 |
| Chlorine, g | 0 | 20.3 |
| Internal radiation dose rate, rep./hr | $1.16 \times 10^6$ | $4.42 \times 10^6$ |
| Total internal radiation dosage, rep | $4.78 \times 10^7$ | $5.15 \times 10^7$ |
| Crude hexachloroethane yield, g | 2.60 | 7.17 |
| Hexachloroethane yield, wt. percent, based on chloroform | 1.5 | 6.2 |

The data in Table III also show that the presence of the halogen, $Cl_2$, promotes the reaction.

Various modifications and alterations of this invention will become apparent to those skilled in the art without departing from the scope and spirit of this invention, and it is to be understood that the foregoing discussion and examples set forth are illustrative of preferred embodiments and should not be construed to unduly limit this invention.

We claim:

1. A method for preparing a hexahaloethane, which comprises subjecting a trihalomethane to actinic radiation having a potential in the range of 3.1 to $1 \times 10^8$ electron volts, and initiating and carrying out said actinic radiation in the presence of a halogen promoter selected from the group consisting of bromine, chlorine, and fluorine.

2. A method for preparing a hexahaloethane, which comprises subjecting a trihalomethane having the formula $HCX_3$ where X is a halogen radical selected from the group consisting of bromine, chlorine, and fluorine, and combinations thereof, to actinic radiation having a potential in the range of 3.1 to $1 \times 10^8$ electron volts, said actinic radiation being initiated and carried out in the presence of a halogen promoter selected from the group consisting of bromine, chlorine, and fluorine, and recovering hexahaloethane from the resulting reaction mixture.

3. A method for preparing hexachloroethane, which comprises subjecting chloroform to gamma rays in the initial presence of chlorine, the dose rate of said gamma rays being in the range from $10^3$ to $10^7$ rep./hr. and the total dosage of said gamma rays being in the range from $10^5$ to $10^{11}$ rep., said chlorine being employed in an amount from 2 to 50 parts by weight per 100 parts of said chloroform, and recovering hexachloroethane from the resulting reaction mixture.

4. The method according to claim 2 wherein the actinic radiation dose rate is from $10^3$ to $10^7$ rep./hr., and the total actinic radiation dosage is from $10^5$ to $10^{11}$ rep.

5. The method according to claim 2 wherein said trihalomethane is chloroform, and said actinic radiation is gamma rays.

6. The method according to claim 2 wherein said trihalomethane is chloroform, said halogen promoter is chlorine, and said actinic radiation is gamma rays.

References Cited in the file of this patent

UNITED STATES PATENTS 2,700,736  Roberts _____ Jan. 25, 1955

OTHER REFERENCES

Chemical Abstracts, volume 77 (1934), page 2272.
Journal of American Chemical Society, vol. 75 (1953), pp. 2222–2227.
Bovey: Effects of Ionizing Radiation on Natural and Synthetic High Polymers, January 1958, pp. 2, 149 and 155.